US010782945B1

(12) United States Patent
Craik et al.

(10) Patent No.: US 10,782,945 B1
(45) Date of Patent: Sep. 22, 2020

(54) ESCAPE ANALYSIS SUPPORTING ON-STACK REPLACEMENT

(71) Applicant: INTERNATIONAL BUSINESS MACHINES CORPORATION, Armonk, NY (US)

(72) Inventors: Andrew James Craik, North York (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/375,259

(22) Filed: Apr. 4, 2019

(51) Int. Cl.
*G06F 8/41* (2018.01)
(52) U.S. Cl.
CPC ............ *G06F 8/4434* (2013.01); *G06F 8/443* (2013.01)
(58) Field of Classification Search
None
See application file for complete search history.

(56) References Cited

U.S. PATENT DOCUMENTS

| 6,381,738 | B1 | 4/2002 | Choi et al. | |
| 7,168,071 | B2 | 1/2007 | Wu et al. | |
| 7,685,586 | B1 | 3/2010 | Foley | |
| 8,677,335 | B1* | 3/2014 | Millikin | G06F 8/45 717/150 |
| 2002/0178437 | A1* | 11/2002 | Blais | G06F 9/449 717/140 |
| 2004/0221281 | A1* | 11/2004 | Suganuma | G06F 8/41 717/151 |
| 2009/0064113 | A1* | 3/2009 | Langman | G06F 8/443 717/148 |

OTHER PUBLICATIONS

Soman et al., "Efficient On-Stack Replacement for Aggressive Specialization of Java Programs," Sep. 2004, UCSB Technical Report #2004-24, p. 1-23. (Year: 2004).*
Cono D'Elia et al., "On-Stack Replacement, Distilled," Jun. 2018, ACM, p. 166-180. (Year: 2018).*
Deok et al., "Stack Allocation and Synchronization Optimizations for Java Using Escape Analysis", Preliminary version of this paper appears in the Proceedings of the OOPSLA '99 Conference, Submitted to ACM Transactions on Programming Languages and Systems, pp. 1-35.

* cited by examiner

*Primary Examiner* — Qing Chen
(74) *Attorney, Agent, or Firm* — Reza Sarbakhsh

(57) ABSTRACT

An enhanced object allocation optimization selectively traverses an intermediate representation detecting on-stack replacement transitions, which when found are analyzed to determine whether a control flow-edge from a first block to a second block that is marked as an OSR resumption block exists. Responding to when the second block is marked, a pseudo call including arguments of all live local variables holding pointers to objects is inserted into the intermediate representation while optimization opportunities exist and executing a modified escape analysis on a modified intermediate representation examining each pseudo call as an escape point for all object references received by the pseudo call as arguments; ignoring uses of local variables dominated by these pseudo calls; and stack allocating objects to handle the non-local control flow due to on-stack replacement control flow using the pseudo call. Responsive to when no further optimization opportunities exist, removing respective inserted pseudo calls needing removal.

20 Claims, 5 Drawing Sheets

ESCAPE ANALYSIS SUPPORTING ON-STACK REPLACEMENT

BACKGROUND

The present invention generally relates to computer processing of data within a data processing system. More specifically, the present invention relates to computer optimization of dynamic memory allocation in the presence of on-stack replacement by the data processing system.

For example, allocation of memory from heap storage of an executing program is an expensive operation because of overhead attributed to the memory allocator when called to allocate the memory and to update book keeping data structures. Beyond this allocation cost, data related consideration is also required for other factors including locality of reference when accessing data stored in the program heap can be expensive because related data are not necessarily stored proximate to one another, the data may not have been accessed recently, and the data competes with other heap data for limited space available in data caches of respective processors.

SUMMARY

According to an embodiment of the present invention, a computer-implemented process for enhanced object allocation optimization, in response to receiving an intermediate representation of a program, selectively traverses basic blocks of the intermediate representation to detect an on-stack replacement transition. In response to detecting the on-stack replacement transition, successors of the on-stack replacement transition detected are analyzed to determine whether a control flow-edge from a first block to a second block that is marked as an OSR resumption block exists. In response to a determination that the second block is marked, a pseudo call is inserted including, as arguments, all (or, in an embodiment, one, some, or all) local variables which hold pointers to objects, into the intermediate representation in the first block prior to the second block to create a modified intermediate representation, wherein the inserted pseudo call includes dummy loads of local variables. A modified escape analysis is executed on the modified intermediate representation by examining each pseudo call as an escape point for all object references received by the pseudo call as arguments; ignoring, by the modified escape analysis, uses of local variables that are dominated by these pseudo calls; stack allocating objects, by the modified escape analysis to handle the non-local control flow due to on-stack replacement control flow using the pseudo call; and executing the modified escape analysis repeatedly until no further optimization opportunities are identified. In response to no further optimization opportunities identified, searching for inserted pseudo calls, by querying a call node in the modified intermediate representation to determine whether a respective pseudo call is a pseudo call that needs to be removed. In response to a determination the respective pseudo call needs to be removed, the respective pseudo call is removed from the modified intermediate representation to restore the semantics of the program.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
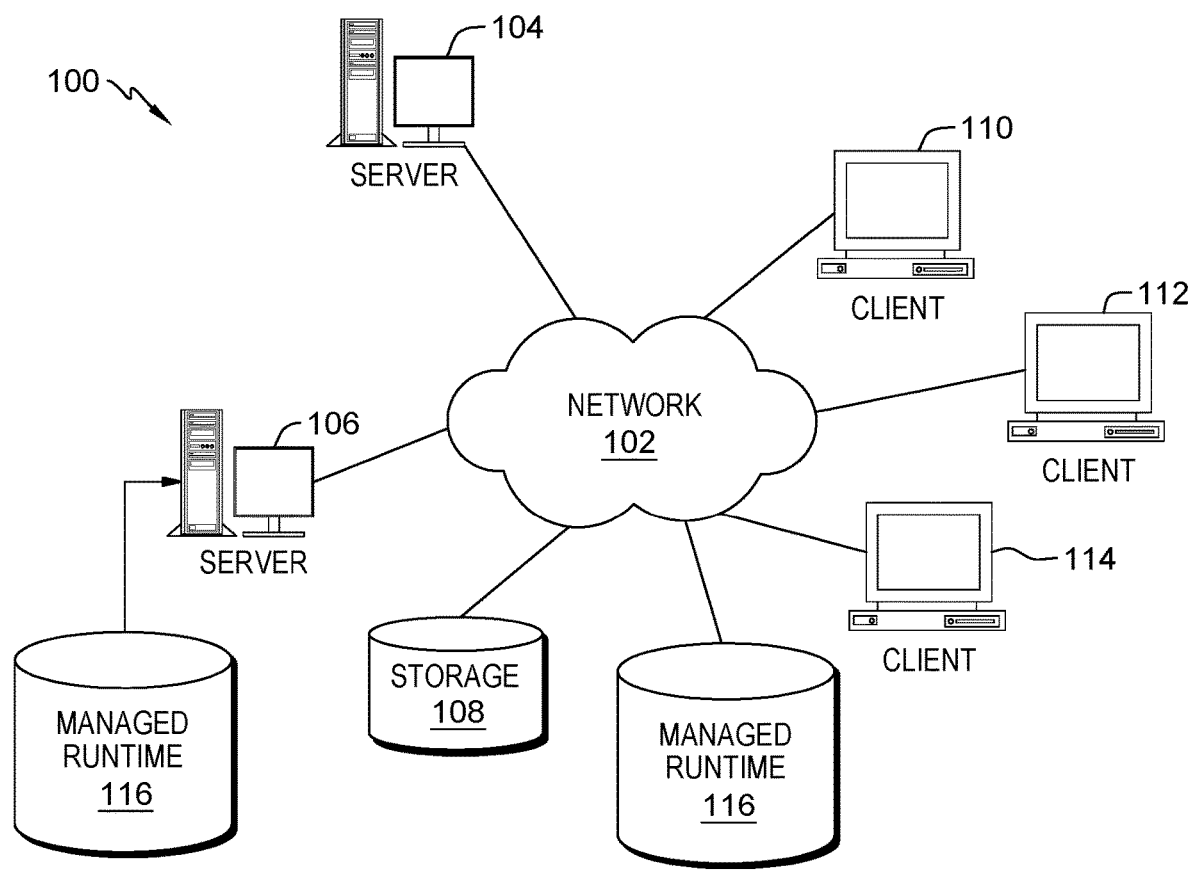
FIG. 1 is a block diagram of a network data processing system operable for various embodiments of the disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and scripting programming languages including Python, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the context of memory allocation, a typical optimization technique, implemented to reduce an amount of heap storage consumed by an application, attempts to stack allocate as many objects as possible. However, this optimization technique typically requires a compiler to analyze where references to an object may be stored to prevent objects which outlive an execution frame in which the objects are allocated from being allocated on the stack and prematurely destroyed by a stack frame popped on return of a function.

In examples in which objects are stored to locations causing a respective lifetime to extend beyond the method execution lifetime, referred to as an "escape," performing a stack allocation of the object on the most common paths is possible provided the object is copied to the heap before any references to the object can escape. Copying an object to the heap prior to an escape is typically referred to as "heapification." However, heapification may not be possible at all points in the program.

For example, in the Java® (Java and all Java-based trademarks are trademarks of Oracle Corporation in the United States, other countries, or both) programming language, when an escape occurs inside an exception handler, validity of stack allocated memory cannot be guaranteed because of the non-local flow of control used to enter the exception handler. While non-local flow of control is common in Java and other modern programming environments for handling of error conditions, non-local flow of control is also typically important for representing forms of complex program optimizations.

Figure 2:
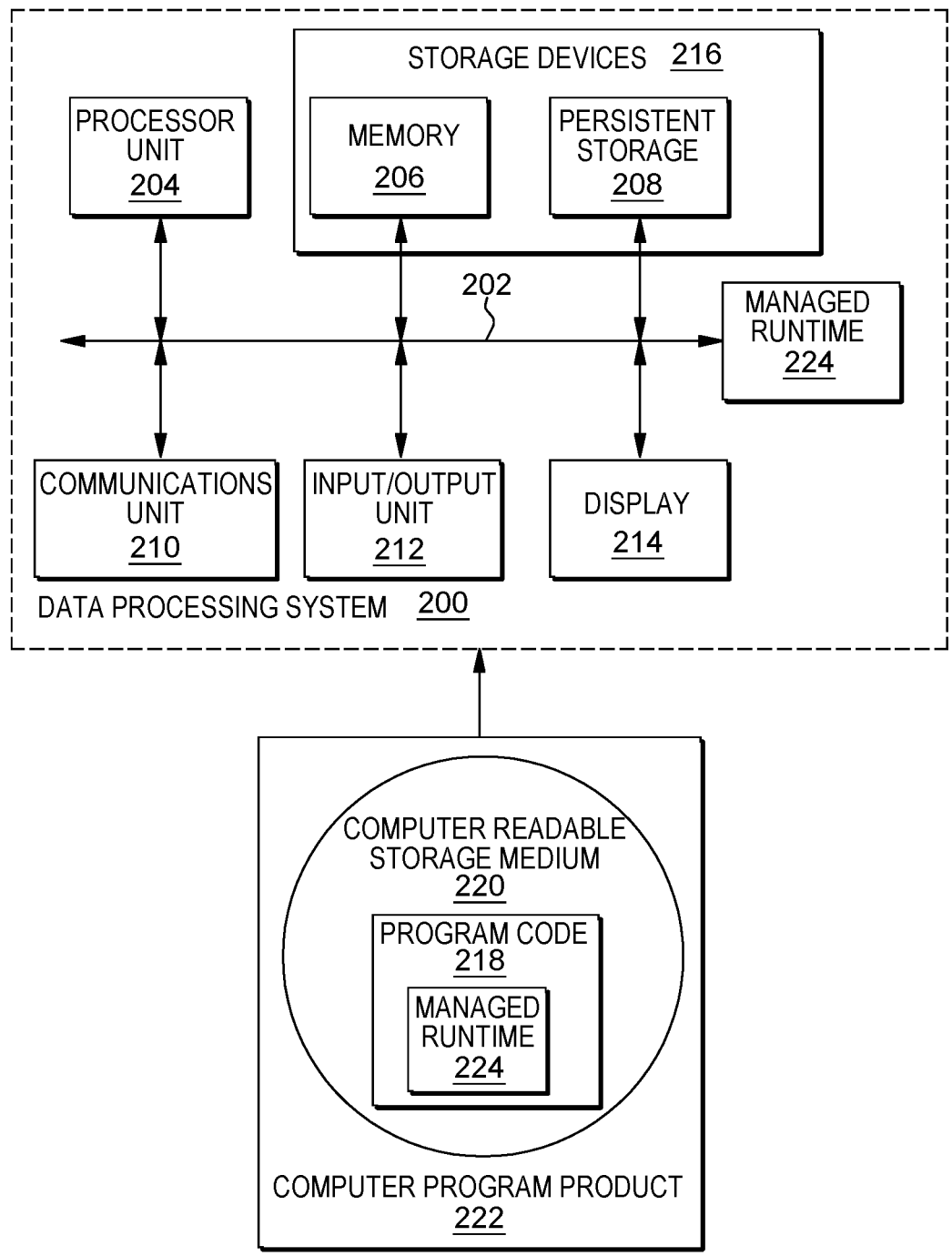
FIG. 2 is a block diagram of a data processing system in the network data processing system of FIG. 1 operable for various embodiments of the disclosure.

With reference now to the Figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, enhanced managed runtime 116 and applications to clients 110, 112, and 114. Clients 110, 112, and 114 are clients to server 104 in this example. In addition, enhanced managed runtime 116 may also be directly accessed using network 102. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, display 214 and enhanced managed runtime 224. Enhanced managed runtime 224 is a variant of enhanced managed runtime 116 of FIG. 1.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random-access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In another example, enhanced managed runtime 224 may also be contained within memory 206 or persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user using a graphical user interface or a nongraphical interface.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as instructions, program instructions, program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable. In one example, program code 218 contains program code, which when executed, causes enhanced managed runtime 224 to be fully functional.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the Operating System (OS) provides the facilities that may support the requirements of the embodiments of the present invention. Any limitations presented may be quite likely a result of a particular type of OS, data processing system programming language, or data processing system and may not be a limitation of the embodiment of the present invention.

Continuing with the example of data processing system 200, program code 218 in one embodiment of the disclosure representative of a computer-implemented process for object allocation optimization may be transferred to data processing system 200 from computer readable storage media 220 for execution by one or more processors for example, processor unit 204. The computer-implemented object allocation optimization when executed by processor unit 204 in response to receiving an intermediate representation of a program, selectively traverses basic blocks of the intermediate representation to detect an on-stack replacement transition. In response to detecting the on-stack replacement transition, successors of the on-stack replacement transition detected are analyzed by processor unit 204 to determine whether a control flow-edge from a first block to a second block that is marked as an OSR resumption block exists. In response to a determination, by processor unit 204, that the second block is marked, a pseudo call is inserted by processor unit 204 including, as arguments, all (or, in an embodiment, one, some, or all) local variables which hold pointers to objects, into the intermediate representation in the first block prior to the second block to create a modified intermediate representation, wherein the inserted pseudo call includes dummy loads of local variables. A modified escape analysis is executed by processor unit 204 on the modified intermediate representation by examining each pseudo call as an escape point for all object references received by the pseudo call as arguments; ignoring, by the modified escape analysis, uses of local variable that are dominated by these pseudo calls; stack allocating objects, by the modified escape analysis to handle the non-local control flow due to on-stack replacement control flow using the pseudo call; and executing the modified escape analysis repeatedly until no further optimization opportunities are identified. In response to no further optimization opportunities identified by processor unit 204, inserted pseudo calls are searched, by processor unit 204 querying a call node in the modified intermediate representation to determine whether a respective call is a pseudo call inserted previously which needs to be removed. In response to a determination by processor unit 204 the respective call needs to be removed; the respective pseudo call is removed from the modified intermediate representation by processor unit 204 to restore the semantics of the program.

Figure 3:
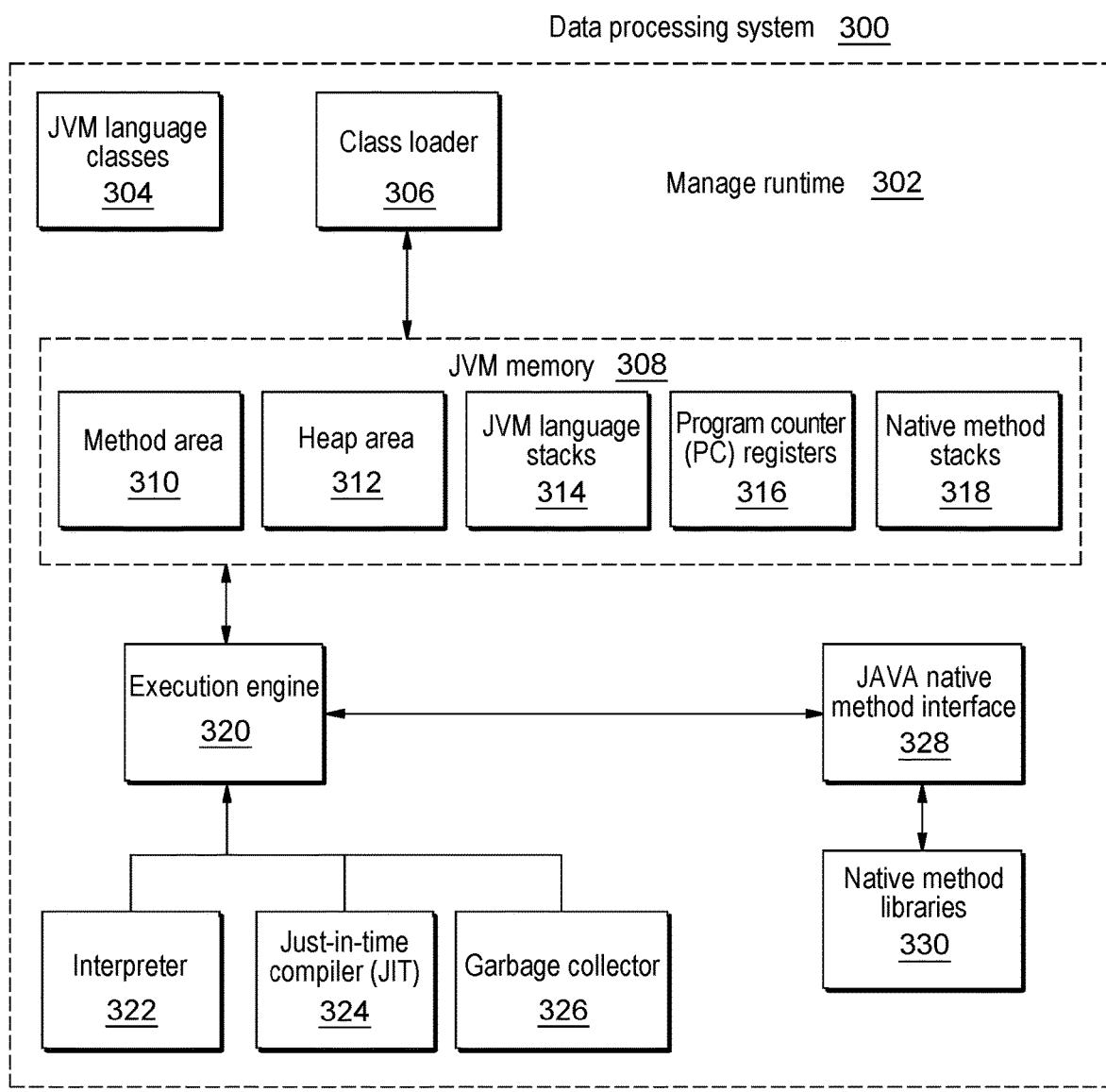
FIG. 3 is a block diagram representation of a data processing system including an enhanced managed runtime operable for various embodiments of the disclosure.

With reference to FIG. 3 a block diagram representation of a data processing system including an enhanced managed runtime in an example of an embodiment of the disclosure is presented. Data processing system 300 is a variation of data processing system 200 of FIG. 2. Data processing system 300 comprises a number of components similar to those of data processing system 200 of FIG. 2 including managed runtime 302, JVM language classes 304, class loader 306, JVM memory 308 including; method area 310, heap area 312, JVM language stacks 314, program counter (PC) registers 316, native method stacks 318, further including execution engine 320, with interpreter 322, just-in-time (JIT) compiler 324, and garbage collector 326, and Java native method interface 328, as well as native method libraries 330. Although in this example a Java virtual machine is described, embodiments of the disclosure work equally well in similar alternative but equivalent programming environments.

Embodiments of the disclosure propose a new technique to facilitate optimal placement of heapification operations in the presence of non-local flow of control. Instead of attempting to trace paths a stack allocated object could flow across to identify where non-local control-flow may force a heapification, in an embodiment of the disclosure, dummy local variable uses are created prior to the non-local control-flow points, for example, exception throws, while uses dominated by the non-local control-flow points are ignored. The optimization enhanced in embodiments of the disclosure is escape analysis or object allocation, enabling stack allocation of objects. The conventional compiler optimization is enhanced in embodiments of the disclosure to support program representations that make use of on stack replacement.

In an embodiment, on-stack replacement (OSR) is a technique that may be described as a technique for switching between one implementation of a function to a different implementation of the same function. For example, when a first implementation of a function is JIT compiled, and a second implementation is an interpreted version of the same function. The on-stack replacement is then a transition between the two different implementations while the function is being executed.

In an embodiment of the disclosure, a compiler represents a transitioning execution from JIT generated code to an interpreter, as an example of on-stack replacement (OSR), using non-local flow of control. Since OSR is enabled by default, to support a number of other optimizations, an embodiment of the disclosure enables escape analysis to continue to function in the presence of OSR infrastructure by forcing heapification to occur prior to the non-local flow of control used in the OSR infrastructure.

Escape analysis is therefore used as a tool to enable subsequent optimization techniques to be considered. Escape analysis provides an examination of a variable in a program to determine where the variable is used and to further detect whether that variable is used outside a predetermined scope. When the variable does not escape that predetermined scope, the variable is identified as a local variable, and the variable can be further examined for specific processing opportunities. Variables that are used only within a limited scope typically enable more optimization opportunities than variables having a more global and therefore non-local scope.

In an embodiment of the disclosure, a modified, or enhanced, escape analysis algorithm provides a capability to create heapifications prior to each of the injected dummy escapes thereby ensuring heapification is completed before any non-local control-flow occurs. Once an escape analysis has completed performing a configurable optimization technique, these dummy escapes, which were previously inserted before the modified escape analysis occurred, are removed. As a result, an embodiment of the disclosure typically saves the processing complexity of path tracing logic and heapification store placement logic because detecting the start of a non-local control-flow is made easier in an embodiment of the disclosure than in conventional tracing from a particular use backward to all potentially reaching non-local control-flows.

Therefore, a capability is provided for a less resource intensive, simpler analysis and an escape-analysis based optimization that remains functionally correct and capable of handling escape via non-local control-flow used to represent on-stack replacement transitions. Embodiments of the disclosure typically provide a low overhead solution even when no optimization occurs. Precision adjustment provided, using an embodiment of the disclosure, exploits existing information including marking of on-stack replacement transitions, for example, exception catch blocks, already performed by JIT compiler 324 to aid in transitions between JIT compiler 324 and interpreter 322 as well as use of liveness information and statistics produced by JIT compiler 324 as a normal product of the compilation process.

JVM memory 308 comprises a number of memory areas including method area 310, heap area 312 and JVM language stacks 314. There is only one occurrence of a method area per JVM, therefore this single occurrence is a shared resource across the JVM. Method area 310 stores class level information including class name, immediate parent class name, and information for associated methods and variables, including static variables.

Similar to the single occurrence of method area 310, there is only a single instance heap area 312 per JVM, shared across the JVM. Heap area 312 stores information including instance variables of all objects.

For each thread created by the JVM of enhanced managed run-time 302, a run-time stack is created and stored in JVM language stacks 314, which is not a shared resource, in contrast with method area 310 and heap area 312. A block of the run-time stack called an activation record, or a stack frame, stores method calls. Local variables for a respective method are stored in a corresponding stack frame. When a thread terminates, the run-time stack associated with the thread is destroyed by the JVM. Each thread has a separate set of program counter registers, PC registers 316, to store the address of a currently executing instruction of the thread. For every thread, a separate native stack, native method stacks 318, is created to store information for a native method.

Execution engine 320 executes the bytecode line by line, using data and information stored in the previously described memory areas. Execution engine 320 comprises interpreter 322, just-in-time compiler (JIT) 324, garbage collector 326, and Java native method interface 328 as well as native method libraries 330.

Interpreter 322 interprets the bytecode line by line and executes the byte code. However, when a method is called many times, interpretation is needed for each call. Just-in-time compiler 324 increases efficiency of using interpreter 322 by compiling the bytecode into native code for the platform enabling interpreter 322 to use native code for the repeated method calls avoiding repetitive interpretation. Garbage collector 326 reclaims memory by removing old objects or objects no longer referenced.

Java native method interface (JNI) 328 enables a capability for an execution to interact with libraries of native platform code in the form of native method libraries 330 either by a call to or a call from a current execution according to a particular hardware implementation.

Figure 4:
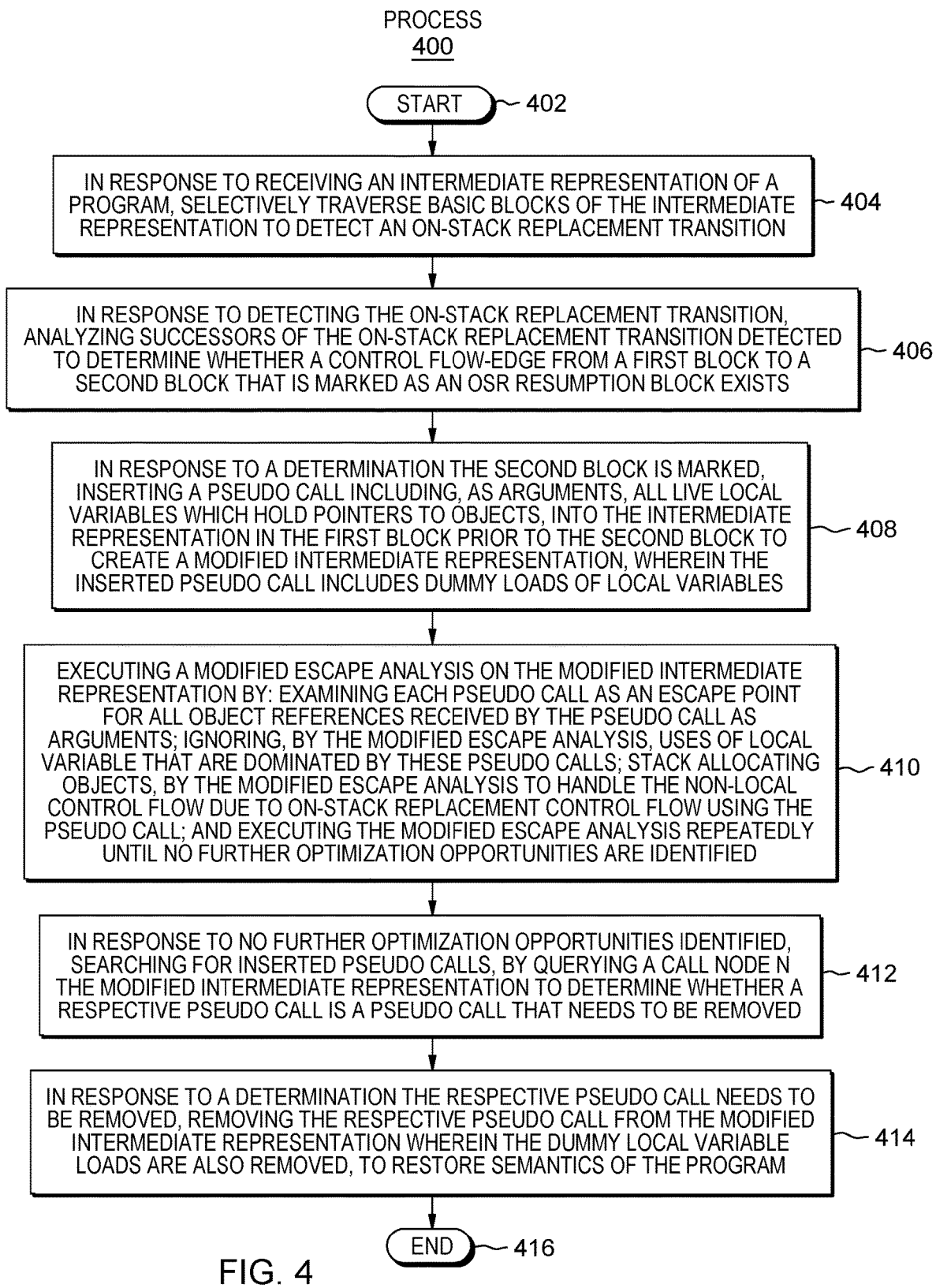
FIG. 4 is a flow diagram of a process for on-stack replacement using the enhanced managed runtime of FIG. 3, operable for various embodiments of the disclosure.

FIG. 4 is a flow diagram of a process for object allocation optimization operable for various embodiments of the disclosure. Process 400 is a high-level view of an example of a process for object allocation optimization in an embodiment of the disclosure including JVM memory 308 of managed runtime 302 all of FIG. 3. However, this is only an example and is not meant to limit the scope of the disclosure to the embodiment described. Escape analysis and stack versus heap allocation can be useful outside of a managed runtime as well, for example, a statically compiled programming language. The disclosed technique, as used with a managed runtime in this example, is therefore equally applicable to other similar or equivalent programming environments. In an embodiment of the disclosure, an enhanced escape analysis is enabled to work when there are on-stack replacement transitions. With regard to the transitions, they are complex, they are expressed in the compiler intermediate representation and the use of non-local control flow via an exception edge which typically prevents performing a heapification.

Process 400 begins, (step 402) and in response to receiving an intermediate representation of a program generated by a prior compilation process, and using a pre-processing pass, selectively traverses the intermediate representation to detect an on-stack replacement transition (step 404). The goal of the pre-processing pass is to insert uses of live local variables holding object references ahead of non-local flow of control, the use of which will cause an early escape of referenced objects. The pre-processing pass is executed only prior to a first execution of a modified escape analysis is executed. Otherwise the pre-processing pass is not executed to reduce unnecessary resource consumption. Detection of on-stack replacement (OSR) transitions, using one example, may made by checking a last instruction in a basic block that is traversed to determine whether the instruction is an exception throw. OSR transitions, in this example, are thus represented by an explicit exception throw which ends a basic block. OSR transitions, including for example, exception catch blocks, are marked with a predetermined flag when generated during intermediate language generation.

In response to detecting the on-stack replacement transition, process 400 analyzes successors of the on-stack replacement transition detected to determine whether a control flow-edge from a first block to a second block that is marked as an OSR resumption block exists (step 406). In response to a determination that the second block is marked, a pseudo call is inserted including, as arguments, all (or, in an embodiment, one, some, or all) local variables which hold pointers to objects, into the intermediate representation in the first block prior to the second block to create a modified intermediate representation (step 408). As a result, this inserted pseudo call includes dummy loads of local variables.

Finding a set of live locals holding object references to place under the pseudo call is a challenge because adding a non-live local could extend a live range of an object and, as a result, reduce opportunities for optimization. Identifying a set of live locals typically requires a dataflow analysis which is expensive from a time and processing perspective. Using a conventional analysis would typically cause a pre-processing pass followed by a post-processing pass design to become as expensive as modifying an escape analysis algorithm to trace escapes backward across an exception control flow.

As an improvement on previous conventional solutions, embodiments of the disclosure are aware on-stack replacement processing tracks how to recreate an interpreter stack state using compiled code. As a result, the on-stack replacement process necessarily tracks which local variables are live at any given transition point. The liveness values are values that need to be copied from the runtime representation of the compiled code to the interpreter. As a result, in embodiments of the disclosure, the pre-computed on-stack replacement liveness information is consulted to identify which locals "escape" using the on-stack replacement control flow. The pre-computed on-stack replacement liveness information remains correct otherwise the on-stack replacement transition would fail to build a correct interpreter state and a transition to the interpreter would cause a corresponding execution error. The modified escape analysis, when used in embodiments of the disclosure, is typically capable of identifying more opportunities once the pseudo calls have been added because the disclosed enhanced escape analysis reduces the number of execution paths along which heapification is not possible.

A modified escape analysis using the pre-computed on-stack replacement liveness information is executed in process 400 on the modified intermediate representation by: examining each pseudo call as an escape point for all object references received by the pseudo call as arguments; ignoring, by the modified escape analysis, uses of local variable that are dominated by these pseudo calls; stack allocating objects, by the modified escape analysis to handle the non-local control flow due to on-stack replacement control flow using the pseudo call; and executing the modified escape analysis repeatedly until no further optimization opportunities are identified (step 410).

The modified escape analysis implementation of an embodiment of the disclosure is an iterative process. Furthermore, to save compile time, as previously stated, the pre-processing pass is conditionally executed only before a first iteration of the escape analysis and the removal of pseudo calls is executed only after a final iteration of the escape analysis has completed.

In response to no further optimization opportunities identified, process 400 searches for inserted pseudo calls by querying a call node in the modified intermediate representation to determine whether a respective call is a pseudo call which needs to be removed (step 412). In response to a determination the respective pseudo call needs to be removed, process 400 removes the respective pseudo call from the modified intermediate representation to restore semantics of the program (step 414) terminating thereafter (step 416).

The post-processing pass previously described also removes the dummy local variable loads added by the pseudo calls inserted in the previous pre-processing pass. The post-processing pass is typically trivial, because a search is performed only for those pseudo calls that were inserted into the intermediate representation by the previous pre-processing pass as pseudo calls with dummy local variables. Only those pseudo calls are later removed after use in an optimization. However, locating the inserted pseudo calls is typically an easy task because the pseudo calls were marked with a predetermined flag when the pseudo calls were generated during intermediate language generation during the pre-processing pass. As a result, a simple query on a call node suffices to determine whether the call is a pseudo call with dummy local variables and therefore should be removed after optimization usage.

Figure 5:
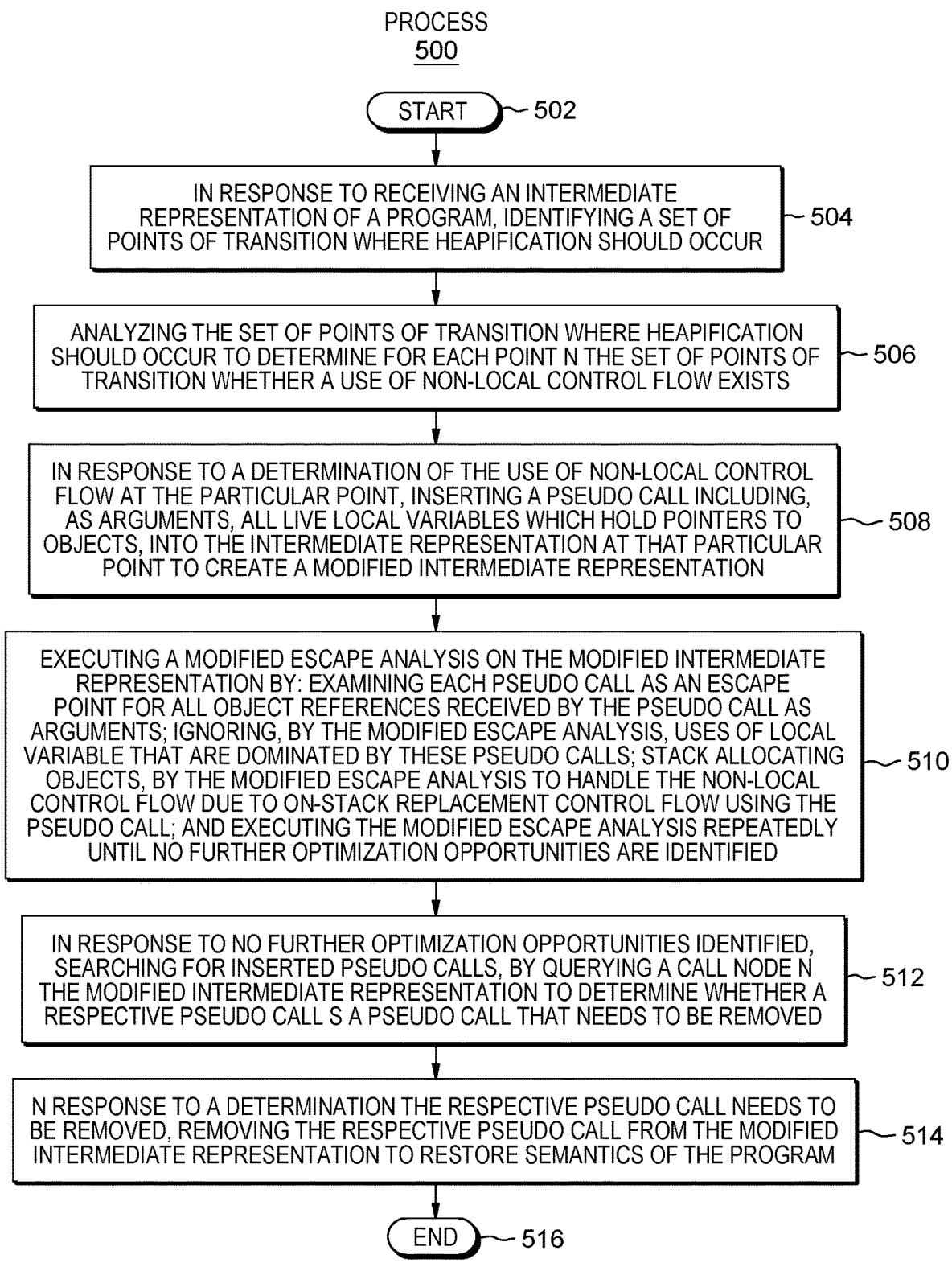
FIG. 5 is a flow diagram of a further process for on-stack replacement using the enhanced managed runtime of FIG. 3, operable for various embodiments of the disclosure.

FIG. 5 is a flow diagram of a further process for object allocation optimization operable for various embodiments of the disclosure. Process 500 is a high-level view of an example of a generalized process for object allocation optimization in another embodiment of the disclosure including JVM memory 308 of managed runtime 302 all of FIG. 3. However, this is only another example and is not meant to limit the scope of the disclosure to the embodiment described. It is possible to use this generalized techniques in other situations where a defined point at which heapification should occur but finding that particular from the perspective of escape is very complicated. This example is another construct with similar properties to the on-stack replacement representation that can be handled by embodiments of the disclosure.

Process 500 begins, (step 502) and in response to receiving an intermediate representation of a program, identifies a set of points of transition where heapification should occur (step 504). Process 500 analyzes the set of points of transition where heapification should occur to determine for each point in the set of points of transition whether a use of non-local control flow exists (step 506).

In response to a determination of the use of non-local control flow at the particular point, process 500 inserts a pseudo call including, as arguments, all (or, in an embodiment, one, some, or all) local variables which hold pointers to objects, into the intermediate representation at that particular point to create a modified intermediate representation (step 508). The inserted pseudo call includes dummy loads of local variables.

As previously stated, finding the particular point at which heapification should occur from the perspective of escape analysis is typically very complicated. However, in an embodiment of the disclosure process 500 executes a modified escape analysis on the modified intermediate representation as an improvement on previous conventional solutions by: examining each pseudo call as an escape point for all object references received by the pseudo call as arguments; ignoring, by the modified escape analysis, uses of local variable that are dominated by these pseudo calls; stack allocating objects, by the modified escape analysis to handle the non-local control flow; and executing the modified escape analysis repeatedly until no further optimization opportunities are identified (step 510).

In response to no further optimization opportunities identified, process 500 searches for inserted pseudo calls, by querying a call node in the modified intermediate representation to determine whether a respective pseudo call is a pseudo call that needs to be removed (step 512). In response to a determination the respective pseudo call needs to be removed, process 500 removes the respective pseudo call from the modified intermediate representation to restore semantics of the program (step 514) and terminates thereafter (step 516).

As with the previous process 400 of FIG. 4, a post-processing pass also removes the dummy local variable loads added by the pseudo calls inserted in the pre-processing pass. The post-processing pass in this alternate example is also typically trivial, because the search is performed only for those pseudo calls that were inserted into the intermediate representation by an earlier pre-processing pass as pseudo calls with dummy local variables. Only those pseudo calls are later removed after use in an optimization. However, locating the inserted pseudo calls is typically an easy task because the pseudo calls were marked with a predetermined flag when the pseudo calls were generated during intermediate language generation during the pre-processing pass. As a result, a simple query on a call node suffices to determine whether the call is a pseudo call with dummy local variable loads that needs to be removed and therefore is removed after optimization usage.

Continuing with a variant of the above example of process 500, in determining whether a use of non-local control flow exists for each point in the set of points of transition the variant of process 500 makes this determination via an exception edge.

In accordance with additional embodiments of the invention, one or more of the following features may be provided. Numbering of any feature or embodiment is not to be construed as requiring any order or combination. Applicant's invention is recited in the claims, and the disclosure below should not be construed so as to limit the scope of the claimed invention.

1. A computer-implemented process for object allocation, comprising:
   in response to receiving an intermediate representation of a program, selectively traversing basic blocks of the intermediate representation to detect an on-stack replacement (OSR) transition;
   in response to detecting the on-stack replacement transition, analyzing successors of the on-stack replacement transition detected to determine whether a control flow-edge from a first block to a second block that is marked as an OSR resumption block exists;
   in response to a determination that the second block is marked, inserting a pseudo call including, as arguments, a plurality of live local variables which hold pointers to objects, into the intermediate representation in the first block prior to the second block to create a modified intermediate representation, wherein the inserted pseudo call includes dummy loads of local variables;
   executing a modified escape analysis on the modified intermediate representation by:
   examining at least one pseudo call as an escape point for one, some, or all object references received by the pseudo call as arguments;
   ignoring, by the modified escape analysis, at least one use of local variable(s) that are dominated by the at least one pseudo call;
   stack allocating objects, by the modified escape analysis to handle the non-local control flow due to on-stack replacement control flow using the at least one pseudo call; and
   executing the modified escape analysis repeatedly until no further optimization opportunities are identified;
   in response to no further optimization opportunities identified, searching for inserted pseudo calls, by querying a call node in the modified intermediate representation to determine whether a respective pseudo call is a pseudo call which needs to be removed; and
   in response to a determination the respective pseudo call needs to be removed, removing the respective pseudo call from the modified intermediate representation to restore semantics of the program.

2. The computer-implemented process of embodiment 1 wherein selectively traversing basic blocks of program intermediate representation to detect on-stack replacement transitions further comprises determining whether a first iteration of the modified escape analysis occurs.

3. The computer-implemented process of embodiment 1 wherein the control flow-edge from a first block to a second block that is marked as an OSR resumption block identifies an exception catch block marked on the control flow-edge from a throwing block to the exception catch block as a start of an on-stack replacement transition.

4. The computer-implemented process of embodiment 1 wherein inserting the pseudo call including, as arguments, a plurality of live local variables which hold pointers to objects, into the intermediate representation in the first block prior to the second block to create a modified intermediate representation defines a set of live locals holding object references as a maximum set of candidates for stack allocation in the modified escape analysis.

5. The computer-implemented process of embodiment 1 further comprising executing a pre-processing pass only before execution of a first iteration of the modified escape analysis.

6. The computer-implemented process of embodiment 1 further comprising executing removal of the respective pseudo call in a post-processing pass only after a final iteration of the modified escape analysis has completed.

7. The computer-implemented method of embodiment 1 wherein inserting the pseudo call including, as arguments, a plurality of live local variables which hold pointers to objects, into the intermediate representation in the first block prior to the second block to create a modified intermediate representation further comprising:
receiving information from on-stack replacement tracking used to recreate an interpreter stack state from compiled code, wherein the on-stack replacement tracking necessarily tracks which local variables are live at any given transition point, and wherein liveness values are values that need to be copied from a runtime representation of compiled code to an interpreter; and
consulting pre-computed on-stack replacement liveness information to identify which locals in a set of live locals escape via on-stack replacement control flow.

8. A system for object allocation, the system comprising:
   a bus;
   a memory connected to the bus, having computer executable instructions stored thereon; and
   one or more processors connected to the bus, wherein at least one of the one or more processors executes the computer executable instructions of a method comprising:
   in response to receiving an intermediate representation of a program, selectively traversing basic blocks of the intermediate representation to detect an on-stack replacement (OSR) transition;
   in response to detecting the on-stack replacement transition, analyzing successors of the on-stack replacement transition detected to determine whether a control flow-edge from a first block to a second block that is marked as an OSR resumption block exists;
   in response to a determination that the second block is marked, inserting a pseudo call including, as arguments, a plurality of live local variables which hold pointers to objects, into the intermediate representation in the first block prior to the second block to create a modified intermediate representation, wherein the inserted pseudo call includes dummy loads of local variables;
   executing a modified escape analysis on the modified intermediate representation by:
   examining at least one pseudo call as an escape point for one, some, or all object references received by the pseudo call as arguments;

ignoring, by the modified escape analysis, at least one use of local variable(s) that are dominated by the at least one pseudo call;

stack allocating objects, by the modified escape analysis to handle the non-local control flow due to on-stack replacement control flow using the at least one pseudo call; and executing the modified escape analysis repeatedly until no further optimization opportunities are identified;

in response to no further optimization opportunities identified, searching for inserted pseudo calls, by querying a call node in the modified intermediate representation to determine whether a respective pseudo call is a pseudo call which needs to be removed; and in response to a determination the respective pseudo call needs to be removed, removing the respective pseudo call from the modified intermediate representation to restore semantics of the program.

9. The system of embodiment 8 wherein the at least one of the one or more processors executes the computer executable instructions to selectively traversing basic blocks of program intermediate representation to detect on-stack replacement transitions further executes the computer executable instructions determining whether a first iteration of the modified escape analysis occurs.

10. The system of embodiment 8 wherein the control flow-edge from a first block to a second block that is marked as an OSR resumption block identifies an exception catch block marked on the control flow-edge from a throwing block to the exception catch block as a start of an on-stack replacement transition.

11. The system of embodiment 8 wherein the at least one of the one or more processors further executes the computer executable instructions to insert the pseudo call including, as arguments, all live local variables which hold pointers to objects, into the intermediate representation in the first block prior to the second block to create a modified intermediate representation further executes the computer executable instructions to define a set of live locals holding object references as a maximum set of candidates for stack allocation in the modified escape analysis.

12. The system of embodiment 8 wherein the at least one of the one or more processors further executes the computer executable instructions to execute a pre-processing pass only before execution of a first iteration of the modified escape analysis.

13. The system of embodiment 8 wherein the at least one of the one or more processors further executes the computer executable instructions to execute removal of the respective pseudo call in a post-processing pass only after a final iteration of the modified escape analysis has completed.

14. The system of embodiment 8 wherein the at least one of the one or more processors further executes the computer executable instructions to insert the pseudo call including, as arguments, a plurality of live local variables which hold pointers to objects, into the intermediate representation in the first block prior to the second block to create a modified intermediate representation further executes the computer executable instructions to:

receive information from on-stack replacement tracking used to recreate an interpreter stack state from compiled code, wherein the on-stack replacement tracking necessarily tracks which local variables are live at any given transition point, and wherein liveness values are values that need to be copied from a runtime representation of compiled code to an interpreter; and consult pre-computed on-stack replacement liveness information to identify which locals in a set of live locals escape via on-stack replacement control flow.

15. A computer program product comprising a computer readable storage medium having computer readable program instructions for object allocation thereon for causing a processor to perform a method comprising:

in response to receiving an intermediate representation of a program, selectively traversing basic blocks of the intermediate representation to detect an on-stack replacement (OSR) transition;

in response to detecting the on-stack replacement transition, analyzing successors of the on-stack replacement transition detected to determine whether a control flow-edge from a first block to a second block that is marked as an OSR resumption block exists;

in response to a determination that the second block is marked, inserting a pseudo call including, as arguments, a plurality of live local variables which hold pointers to objects, into the intermediate representation in the first block prior to the second block to create a modified intermediate representation, wherein the inserted pseudo call includes dummy loads of local variables;

executing a modified escape analysis on the modified intermediate representation by:

examining at least one pseudo call as an escape point for one, some, or all object references received by the pseudo call as arguments;

ignoring, by the modified escape analysis, at least one use of local variable(s) that are dominated by the at least one pseudo call;

stack allocating objects, by the modified escape analysis to handle the non-local control flow due to on-stack replacement control flow using the at least one pseudo call; and executing the modified escape analysis repeatedly until no further optimization opportunities are identified;

in response to no further optimization opportunities identified, searching for inserted pseudo calls, by querying a call node in the modified intermediate representation to determine whether a respective pseudo call is a pseudo call which needs to be removed; and in response to a determination the respective pseudo call needs to be removed, removing the respective pseudo call from the modified intermediate representation to restore semantics of the program.

16. The computer program product of embodiment 15 wherein the computer readable program instructions for selectively traversing basic blocks of program intermediate representation to detect on-stack replacement transitions further comprising computer readable program instructions for determining whether a first iteration of the modified escape analysis occurs.

17. The computer program product of embodiment 15 wherein the control flow-edge from a first block to a second block that is marked as an OSR resumption block identifies an exception catch block marked on the control flow-edge from a throwing block to the exception catch block as a start of an on-stack replacement transition.

18. The computer program product of embodiment 15 wherein the computer readable program instructions for inserting the pseudo call including, as arguments, a plurality of live local variables which hold pointers to objects, into the intermediate representation in the first block prior to the second block to create a modified intermediate representation further comprising computer readable program instructions for defining a set of live locals holding object references as a maximum set of candidates for stack allocation in the modified escape analysis.

19. The computer program product of embodiment 15 wherein the computer readable program instructions further comprising:
computer readable program instructions for executing a pre-processing pass only before execution of a first iteration of the modified escape analysis; and
computer readable program instructions for executing removal of the respective pseudo call in a post-processing pass only after a final iteration of the modified escape analysis has completed.

20. The computer program product of embodiment 15 wherein the computer readable program instructions for inserting the pseudo call including, as arguments, a plurality of live local variables which hold pointers to objects, into the intermediate representation in the first block prior to the second block to create a modified intermediate representation further comprising:
computer readable program instructions for receiving information from on-stack replacement tracking used to recreate an interpreter stack state from compiled code, wherein the on-stack replacement tracking necessarily tracks which local variables are live at any given transition point, and wherein liveness values are values that need to be copied from a runtime representation of compiled code to an interpreter; and
computer readable program instructions for consulting pre-computed on-stack replacement liveness information to identify which locals in a set of live locals escape via on-stack replacement control flow.

21. A computer-implemented process for enhanced object allocation optimization, the computer computer-implemented process comprising:
in response to receiving an intermediate representation of a program, identifying a set of points of transition where heapification should occur;
determining for each point in the set of points of transition whether a use of non-local control flow exists;
in response to a determination of the use of non-local control flow at the particular point, inserting a pseudo call including, as arguments, all live local variables which hold pointers to objects, into the intermediate representation at that particular point to create a modified intermediate representation, wherein the inserted pseudo call includes dummy loads of local variables;
executing a modified escape analysis on the modified intermediate representation by:
examining each pseudo call as an escape point for all object references received by the pseudo call as arguments;
ignoring, by the modified escape analysis, uses of local variable that are dominated by these pseudo calls;
stack allocating objects, by the modified escape analysis to handle the non-local control flow; and
executing the modified escape analysis repeatedly until no further optimization opportunities are identified;
in response to no further optimization opportunities identified, searching for inserted pseudo calls, by querying a call node in the modified intermediate representation to determine whether a respective pseudo call is a pseudo call that needs to be removed; and
in response to a determination the respective pseudo call needs to be removed, removing the respective pseudo call from the modified intermediate representation to restore semantics of the program.

22. The computer-implemented process of embodiment 21 wherein determining whether a use of non-local control flow exists for each point in the set of points of transition is made via an exception edge.

23. The computer-implemented process of embodiment 21 further comprising executing a pre-processing pass only before execution of a first iteration of the modified escape analysis.

24. The computer-implemented process of embodiment 21 further comprising executing removal of the respective pseudo call in a post-processing pass only after a final iteration of the modified escape analysis has completed.

25. The computer-implemented method of embodiment 21 wherein inserting the pseudo call including, as arguments, all live local variables which hold pointers to objects, into the intermediate representation at that particular point to create a modified intermediate representation further comprising:
receiving information from on-stack replacement tracking used to recreate an interpreter stack state from compiled code, wherein the on-stack replacement tracking necessarily tracks which local variables are live at any given transition point, and wherein liveness values are values that need to be copied from a runtime representation of compiled code to an interpreter; and
consulting pre-computed on-stack replacement liveness information to identify which locals in a set of live locals escape via on-stack replacement control flow.

Thus, is described in one embodiment, a computer-implemented process for on-stack replacement in an enhanced conventional escape analysis which aims to stack allocate objects. The computer computer-implemented process for enhanced object allocation optimization comprising, in response to receiving an intermediate representation of a program, selectively traversing basic blocks of the intermediate representation to detect an on-stack replacement transition. In response to detecting the on-stack replacement transition, successors of the on-stack replacement transition detected are analyzed to determine whether a control flow-edge from a first block to a second block that is marked as an OSR resumption block exists. In response to a determination that the second block is marked, a pseudo call is inserted including, as arguments, all (or, in an embodiment, one, some, or all) local variables which hold pointers to objects, into the intermediate representation in the first block prior to the second block to create a modified intermediate representation, wherein the inserted pseudo call includes dummy loads of local variables.

A modified escape analysis is executed on the modified intermediate representation by examining each pseudo call as an escape point for all object references received by the pseudo call as arguments; ignoring, by the modified escape analysis, uses of local variable that are dominated by these pseudo calls; stack allocating objects, by the modified escape analysis to handle the non-local control flow due to on-stack replacement control flow using the pseudo call; and executing the modified escape analysis repeatedly until no further optimization opportunities are identified.

In response to no further optimization opportunities identified, inserted pseudo calls are searched for by querying a call node in the modified intermediate representation to determine whether a respective pseudo call is a pseudo call that needs to be removed. In response to a determination the respective pseudo call needs to be removed, the respective pseudo call is removed from the modified intermediate representation, wherein the dummy local variable loads are also removed, thereby restoring semantics of the program.

In an alternative embodiment of the disclosure, a computer-implemented process for enhanced object allocation optimization, in response to receiving an intermediate representation of a program, identifies a set of points of transition where heapification should occur. The process determines for each point in the set of points of transition whether a use of non-local control flow exists. Such determination may be made by known processing including via an exception edge.

In response to a determination of the use of non-local control flow at the particular point, a pseudo call is inserted including, as arguments, all (or, in an embodiment, one, some, or all) local variables which hold pointers to objects, into the intermediate representation at that particular point to create a modified intermediate representation. The inserted pseudo call includes dummy loads of local variables.

A modified escape analysis is executed on the modified intermediate representation including examining each pseudo call as an escape point for all object references received by the pseudo call as arguments; ignoring, by the modified escape analysis, uses of local variable that are dominated by these pseudo calls; stack allocating objects, by the modified escape analysis to handle the non-local control flow; and executing the modified escape analysis repeatedly until no further optimization opportunities are identified.

In response to no further optimization opportunities identified, a search for inserted pseudo calls, by querying a call node in the modified intermediate representation is performed to determine whether a respective pseudo call is a pseudo call that needs to be removed. In response to a determination the respective pseudo call needs to be removed, the respective pseudo call is removed from the modified intermediate representation to restore semantics of the program.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for object allocation, comprising:
   in response to receiving an intermediate representation of a program, selectively traversing basic blocks of the intermediate representation of the program to detect an on-stack replacement (OSR) transition;
   in response to detecting the OSR transition, analyzing successors of the detected OSR transition to determine whether a control flow-edge from a first block to a second block that is marked as an OSR resumption block exists;
   in response to a determination that the control flow-edge from the first block to the second block is marked as the OSR resumption block, inserting a pseudo call including, as arguments, a plurality of live local variables which hold pointers to objects, into the intermediate representation of the program in the first block prior to the second block to create a modified intermediate representation of the program, wherein the inserted pseudo call includes dummy loads of local variables;
   executing a modified escape analysis on the modified intermediate representation of the program by:
      examining at least one pseudo call as an escape point for one, some, or all object references received by the pseudo call as arguments;
      ignoring, by the modified escape analysis, at least one use of local variable(s) that are dominated by the at least one pseudo call;
      stack allocating objects, by the modified escape analysis to handle a non-local control flow due to an OSR control flow using the at least one pseudo call; and
      executing the modified escape analysis repeatedly until no further optimization opportunities are identified;
   in response to no further optimization opportunities identified, searching for inserted pseudo calls, by querying a call node in the modified intermediate representation of the program to determine whether a respective pseudo call is a pseudo call which needs to be removed; and in response to a determination that the respective pseudo call needs to be removed, removing the respective pseudo call from the modified intermediate representation of the program to restore semantics of the program.

2. The computer-implemented process of claim 1 wherein selectively traversing basic blocks of the intermediate representation of the program to detect an OSR transition further comprises determining whether a first iteration of the modified escape analysis occurs.

3. The computer-implemented process of claim 1 wherein the control flow-edge from a first block to a second block that is marked as an OSR resumption block identifies an exception catch block marked on the control flow-edge from a throwing block to the exception catch block as a start of an OSR transition.

4. The computer-implemented process of claim 1 wherein inserting the pseudo call including, as arguments, a plurality of live local variables which hold pointers to objects, into the intermediate representation of the program in the first block prior to the second block to create a modified intermediate representation of the program further defines a set of live local variables holding object references as a maximum set of candidates for stack allocation in the modified escape analysis.

5. The computer-implemented process of claim 1 further comprising executing a pre-processing pass only before execution of a first iteration of the modified escape analysis.

6. The computer-implemented process of claim 1 further comprising executing removal of the respective pseudo call in a post-processing pass only after a final iteration of the modified escape analysis has completed.

7. The computer-implemented process of claim 1 wherein inserting the pseudo call including, as arguments, a plurality of live local variables which hold pointers to objects, into the intermediate representation of the program in the first block prior to the second block to create a modified intermediate representation of the program further comprising:

receiving information from an OSR tracking used to recreate an interpreter stack state from compiled code, wherein the OSR tracking necessarily tracks which local variables are live at any given transition point, and wherein liveness values are values that need to be copied from a runtime representation of compiled code to an interpreter; and consulting pre-computed OSR liveness information to identify which local variables in a set of live local variables escape via the OSR control flow.

8. A system for object allocation, the system comprising:
a bus;
a memory connected to the bus, having computer executable instructions stored thereon; and
one or more processors connected to the bus, wherein at least one of the one or more processors executes the computer executable instructions of a method comprising:
in response to receiving an intermediate representation of a program, selectively traversing basic blocks of the intermediate representation of the program to detect an on-stack replacement (OSR) transition;
in response to detecting the OSR transition, analyzing successors of the detected OSR transition to determine whether a control flow-edge from a first block to a second block that is marked as an OSR resumption block exists;

in response to a determination that the control flow-edge from the first block to the second block is marked as the OSR resumption block, inserting a pseudo call including, as arguments, a plurality of live local variables which hold pointers to objects, into the intermediate representation of the program in the first block prior to the second block to create a modified intermediate representation of the program, wherein the inserted pseudo call includes dummy loads of local variables;

executing a modified escape analysis on the modified intermediate representation of the program by:
examining at least one pseudo call as an escape point for one, some, or all object references received by the pseudo call as arguments;
ignoring, by the modified escape analysis, at least one use of local variable(s) that are dominated by the at least one pseudo call;
stack allocating objects, by the modified escape analysis to handle a non-local control flow due to an OSR control flow using the at least one pseudo call; and
executing the modified escape analysis repeatedly until no further optimization opportunities are identified;

in response to no further optimization opportunities identified, searching for inserted pseudo calls, by querying a call node in the modified intermediate representation of the program to determine whether a respective pseudo call is a pseudo call which needs to be removed; and in response to a determination that the respective pseudo call needs to be removed, removing the respective pseudo call from the modified intermediate representation of the program to restore semantics of the program.

9. The system of claim 8 wherein the at least one of the one or more processors further executes the computer executable instructions to selectively traverse basic blocks of the intermediate representation of the program to detect an OSR transition further executes the computer executable instructions to determine whether a first iteration of the modified escape analysis occurs.

10. The system of claim 8 wherein the control flow-edge from a first block to a second block that is marked as an OSR resumption block identifies an exception catch block marked on the control flow-edge from a throwing block to the exception catch block as a start of an OSR transition.

11. The system of claim 8 wherein the at least one of the one or more processors further executes the computer executable instructions to insert the pseudo call including, as arguments, a plurality of live local variables which hold pointers to objects, into the intermediate representation of the program in the first block prior to the second block to create a modified intermediate representation of the program further executes the computer executable instructions to define a set of live local variables holding object references as a maximum set of candidates for stack allocation in the modified escape analysis.

12. The system of claim 8 wherein the at least one of the one or more processors further executes the computer executable instructions to execute a pre-processing pass only before execution of a first iteration of the modified escape analysis.

13. The system claim 8 wherein the at least one of the one or more processors further executes the computer executable instructions to execute removal of the respective pseudo call in a post-processing pass only after a final iteration of the modified escape analysis has completed.

14. The system of claim 8 wherein the at least one of the one or more processors further executes the computer executable instructions to insert the pseudo call including, as arguments, a plurality of live local variables which hold pointers to objects, into the intermediate representation of the program in the first block prior to the second block to create a modified intermediate representation of the program further executes the computer executable instructions to:
   receive information from an OSR tracking used to recreate an interpreter stack state from compiled code, wherein the OSR tracking necessarily tracks which local variables are live at any given transition point, and wherein liveness values are values that need to be copied from a runtime representation of compiled code to an interpreter; and
   consult pre-computed OSR liveness information to identify which local variables in a set of live local variables escape via the OSR control flow.

15. A computer program product comprising a computer readable storage medium having computer readable program instructions for object allocation stored thereon for causing a processor to perform a method comprising:
   in response to receiving an intermediate representation of a program, selectively traversing basic blocks of the intermediate representation of the program to detect an on-stack replacement (OSR) transition;
   in response to detecting the OSR transition, analyzing successors of the detected OSR transition to determine whether a control flow-edge from a first block to a second block that is marked as an OSR resumption block exists;
   in response to a determination that the control flow-edge from the first block to the second block is marked as the OSR resumption block, inserting a pseudo call including, as arguments, a plurality of live local variables which hold pointers to objects, into the intermediate representation of the program in the first block prior to the second block to create a modified intermediate representation of the program, wherein the inserted pseudo call includes dummy loads of local variables;
   executing a modified escape analysis on the modified intermediate representation of the program by:
      examining at least one pseudo call as an escape point for one, some, or all object references received by the pseudo call as arguments;
      ignoring, by the modified escape analysis, at least one use of local variable(s) that are dominated by the at least one pseudo call;
      stack allocating objects, by the modified escape analysis to handle a non-local control flow due to an OSR control flow using the at least one pseudo call; and
      executing the modified escape analysis repeatedly until no further optimization opportunities are identified;
   in response to no further optimization opportunities identified, searching for inserted pseudo calls, by querying a call node in the modified intermediate representation of the program to determine whether a respective pseudo call is a pseudo call which needs to be removed; and
   in response to a determination that the respective pseudo call needs to be removed, removing the respective pseudo call from the modified intermediate representation of the program to restore semantics of the program.

16. The computer program product of claim 15 wherein the computer readable program instructions for causing the processor to perform selectively traversing basic blocks of the intermediate representation of the program to detect an OSR transition further comprising computer readable program instructions for causing the processor to perform determining whether a first iteration of the modified escape analysis occurs.

17. The computer program product of claim 15 wherein the control flow-edge from a first block to a second block that is marked as an OSR resumption block identifies an exception catch block marked on the control flow-edge from a throwing block to the exception catch block as a start of an OSR transition.

18. The computer program product of claim 15 wherein the computer readable program instructions for causing the processor to perform inserting the pseudo call including, as arguments, a plurality of live local variables which hold pointers to objects, into the intermediate representation of the program in the first block prior to the second block to create a modified intermediate representation of the program further comprising computer readable program instructions for causing the processor to perform defining a set of live local variables holding object references as a maximum set of candidates for stack allocation in the modified escape analysis.

19. The computer program product of claim 15 wherein the computer readable program instructions further comprising:
   computer readable program instructions for causing the processor to perform executing a pre-processing pass only before execution of a first iteration of the modified escape analysis; and
   computer readable program instructions for causing the processor to perform executing removal of the respective pseudo call in a post-processing pass only after a final iteration of the modified escape analysis has completed.

20. The computer program product of claim 15 wherein the computer readable program instructions for causing the processor to perform inserting the pseudo call including, as arguments, a plurality of live local variables which hold pointers to objects, into the intermediate representation of the program in the first block prior to the second block to create a modified intermediate representation of the program further comprising:
   computer readable program instructions for causing the processor to perform receiving information from an OSR tracking used to recreate an interpreter stack state from compiled code, wherein the OSR tracking necessarily tracks which local variables are live at any given transition point, and wherein liveness values are values that need to be copied from a runtime representation of compiled code to an interpreter; and
   computer readable program instructions for causing the processor to perform consulting pre-computed OSR liveness information to identify which local variables in a set of live local variables escape via the OSR control flow.

* * * * *